United States Patent
Kolbe et al.

[11] Patent Number: 5,980,000
[45] Date of Patent: Nov. 9, 1999

[54] CIRCUITRY FOR A BRAKE SYSTEM WITH TRACTION SLIP CONTROL BY BRAKE MANAGEMENT

[75] Inventors: Alexander Kolbe, Gross-Zimmern; Verena Alberg, Friedrichshafen, both of Germany

[73] Assignee: ITT Automotive Europe GmbH, Germany

[21] Appl. No.: 08/765,274

[22] PCT Filed: Jun. 13, 1995

[86] PCT No.: PCT/EP95/02290

§ 371 Date: Dec. 20, 1996

§ 102(e) Date: Dec. 20, 1996

[87] PCT Pub. No.: WO95/35229

PCT Pub. Date: Dec. 28, 1995

[30] Foreign Application Priority Data

Jun. 20, 1994 [DE] Germany ............... 44 21 565

[51] Int. Cl.⁶ .................................................. B60T 8/32
[52] U.S. Cl. .................................... 303/139; 303/148
[58] Field of Search ........................ 303/139, 140, 303/143, 145, 146, 147, 148, 149, 163, 165, 113.2; 701/82, 83, 90

[56] References Cited

U.S. PATENT DOCUMENTS

| | | | |
|---|---|---|---|
| 4,984,165 | 1/1991 | Muller et al. ............... | 303/139 X |
| 5,293,315 | 3/1994 | Kolbe et al. ............... | 303/139 |
| 5,322,356 | 6/1994 | Kolbe et al. . | |
| 5,415,468 | 5/1995 | Latarnik et al. . | |
| 5,601,347 | 2/1997 | Fischle et al. ............... | 303/139 X |

FOREIGN PATENT DOCUMENTS

| | | |
|---|---|---|
| 3 724 575 | 2/1988 | Germany . |
| 4 011 974 | 9/1991 | Germany . |
| 4 017 845 | 12/1991 | Germany . |
| 4 022 471 | 1/1992 | Germany . |
| 4 120 578 | 1/1992 | Germany . |
| 4 204 310 | 8/1992 | Germany . |
| 4 212 637 | 10/1992 | Germany . |
| 4 216 514 | 11/1993 | Germany . |
| 3 741 247 | 5/1989 | United Kingdom . |
| 92/08629 | 5/1992 | WIPO . |

*Primary Examiner*—Lee W. Young
*Attorney, Agent, or Firm*—Ratner & Prestia

[57] ABSTRACT

Circuitry for a brake system with traction slip control by brake management, wherein the traction slip control thresholds are variable, in excess of which braking pressure is introduced into the wheel brake of the overspeeding wheel. After the overspeeding of a wheel of a driven axle and the commencement of the control, the traction slip of the second, non-controlled wheel of the driven axle is determined and evaluated to produce a correction factor which adapts the traction slip control thresholds of the controlled wheel to the instantaneous slip of the second, non-controlled wheel.

10 Claims, 3 Drawing Sheets

CIRCUITRY FOR A BRAKE SYSTEM WITH TRACTION SLIP CONTROL BY BRAKE MANAGEMENT This application is the U.S. national-phase application of PCT International Application No. PCT/EP95/02290.

BACKGROUND OF THE INVENTION

The present invention relates to a circuit for a brake system with traction slip control by brake management which includes wheel sensors to measure the wheel rotational behavior and electronic circuits to evaluate the sensor signals and to generate braking pressure control signals which are used to introduce braking pressure into the wheel brakes of the overspeeding wheel when a predetermined variable traction slip control threshold is exceeded.

A circuit of this type is disclosed in German patent application No. 40 17 845, for example. The traction slip of each driven wheel is controlled individually. The control threshold, in excess of which traction slip control commences, is variable in this known circuitry. The control threshold includes a predetermined basic value and a portion derived from the wheel slip acceleration. Suitably, a wheel slip value responsive to the vehicle speed is used as a basic value. To improve the starting behavior, the basic threshold founds on a relatively high initial value which decreases linearly with the vehicle speed and reincreases starting from a defined vehicle speed of, for example, 25 km/h.

The purpose of such a variation of the control thresholds, which determine the commencement of traction slip control, is to conform the traction slip control or the introduction of pressure into the wheel brake of the overspeeding wheel, in comparison to known control systems with invariable control thresholds, with a still greater accuracy to different road conditions, with the objective of improving the control quality.

German patent No. 37 41 247 discloses conforming the slip threshold values for a traction slip control system to the tires of an automotive vehicle.

SUMMARY OF THE INVENTION

The general objective of the present invention is also to improve the starting behavior of a vehicle. In particular, the traction or the driving behavior, the driving stability and the steerability (in vehicles with front-wheel drive) is improved on road surfaces having low coefficients of friction and in situations with slight differences in the coefficients of friction between right/left.

It has been found that this objective can be achieved by a circuit of the type previously mentioned having special features which involve circuits which, after overspeeding of a wheel of a driven axle and commencement of traction slip control, determine the traction slip of the second, non-controlled wheel of the driven axle and evaluate this value to produce a correction factor which corrects the traction slip control threshold of the controlled wheel as a function of the instantaneous traction slip of the second, non-controlled wheel.

Thus, the present invention is based on the consideration that it is not, or not only, the control of the overspeeding wheel having the worse road contact which is of importance for improving the traction and steerability of the vehicle. Rather, the stabilization of the second, non-controlled drive wheel having the higher coefficient of friction is most important. In contrast to prior art traction slip control systems with brake management, therefore, the control threshold of the controlled wheel is varied as a function of the traction slip of the non-controlled wheel which is on the side with the high coefficient of friction in the majority of cases. Therefore, the control threshold of the drive wheel on the low friction side is conformed to the coefficient of friction on the high friction side such that a maximum possible engine torque is transmitted to the high friction wheel by way of the low friction side. Ideally, an amount of traction slip as high as required to optimally utilize the coefficient of friction develops on the high friction side where no control is effected. The wheel remains in the stable range of the $\mu$-slip curve. Should the friction value change so that now the relatively higher coefficient of friction is on the other side, the control system will be adapted to the different conditions. Braking pressure is introduced on the side with the low coefficient of friction, namely to such an extent that traction on the high friction side becomes optimal.

The control according to the present invention is independent of whether the differences in the coefficients of friction are slight or great.

Similar to prior art systems, the predetermined basic control threshold which determines the commencement of the traction slip control is suitably a function of the vehicle speed and the wheel acceleration or the slip acceleration. The control threshold is conformed to the traction slip of the second wheel, having the higher coefficient of friction, by way of the correction factor.

In a preferred aspect of the present invention, the traction slip control threshold of the controlled wheel is raised (beyond a basic threshold) by way of the correction factor as long as the traction slip of the non-controlled wheel is in excess of a predetermined traction slip threshold, and is lowered until the basic threshold is reached as long as the traction slip of the non-controlled wheel is below the predetermined threshold.

Appropriately, the correction factor is produced pursuant the relation $$f_{CORRECTION} = f_1(t) - f_2(t),$$

and the first component $f_1(t)$ of this correction factor, as long as the traction slip of the non-controlled wheel exceeds a predetermined threshold, raises the control threshold, and the second component $f_2(t)$ lowers the control threshold until the basic threshold is reached, as long as the traction slip of the non-controlled wheel is below the predetermined traction slip threshold and $f_{CORRECTION} > 0$.

Favorably, the two components $f_1(t)$ and $f_2(t)$ of the correction factor are functions which rise or decrease linearly as a function of time.

According to the present invention, the function which determines the rise of the traction slip control threshold of the controlled wheel has a steeper gradient than the function which determines the decrease of the traction slip control threshold.

Further details of the circuitry according to the present invention can be seen in the following description of embodiments making reference to the accompanying drawings.

DETAILED DESCRIPTION OF THE INVENTION

Figure 1:
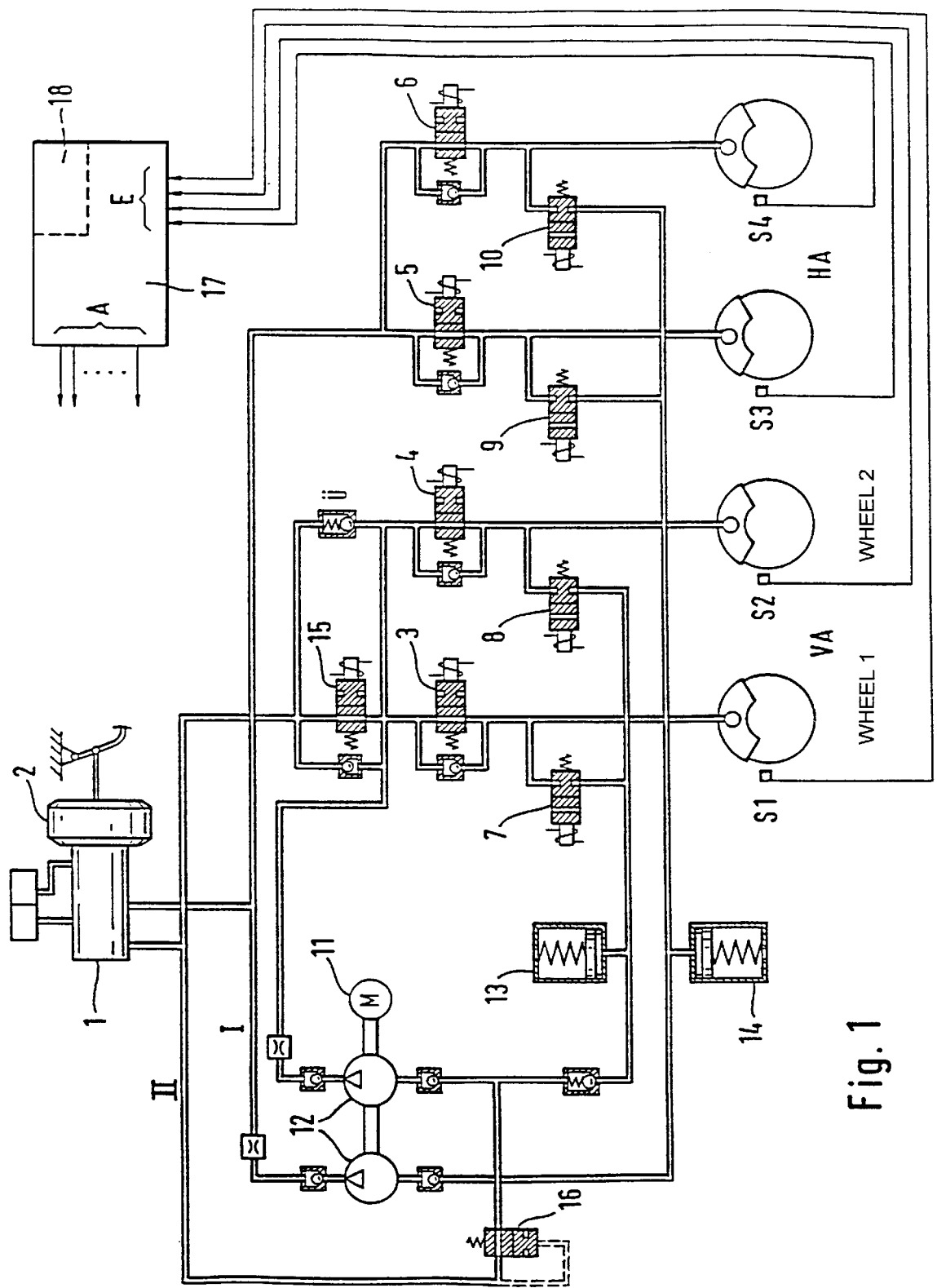
FIG. 1 shows the essential hydraulic and electric components of a brake system in which the present invention is implemented.

FIG. 1 shows a dual-circuit hydraulic brake system which is appropriate for anti-lock control (ABS) and traction slip control by brake management (BASR). The non-driven vehicle wheels, i.e., the wheels of the rear axle HA, are connected to a brake circuit I, and the wheels of the front axle VA are connected to the other brake circuit II.

The brake system of FIG. 1 includes a tandem master cylinder 1 preceded by a vacuum booster 2. Each vehicle wheel is associated with an inlet valve 3 to 6, open in its inactive position, and an outlet valve 7 to 10, closed in its inactive position. A dual-circuit hydraulic pump 12, including a joint drive motor 11, is provided for the return delivery of the pressure fluid discharged by way of the outlet valves 7 to 10 in the pressure reduction period of a control operation. Further, each brake circuit includes a low-pressure accumulator 13, 14 which takes up pressure fluid in a known manner in the initial period of an anti-lock control operation.

The branch of the hydraulic pump 12 which supplies pressure fluid to the brake circuit II is also used for the generation of braking pressure during a traction slip control operation. A separating valve 15, which is inserted in the pressure fluid conduit between the master cylinder 1 and the wheel brakes of the driven wheels, is required for the braking pressure increase during a traction slip control period when the master cylinder 1 is unpressurized. Pressure fluid is conducted from the master cylinder 1 to the suction side of the hydraulic pump 12 of the hydraulic circuit 2 by way of a hydraulically operated two-way/two-position directional control valve 16 in the traction slip control period.

A pressure relief valve Ü limits the pressure, which develops by delivery of the pump 12 during the traction slip control operation, to a predetermined maximum value.

Each vehicle wheel has a wheel sensor S1 to S4 in FIG. 1. The output signals of the wheel sensors are sent to the inputs E of an electronic controller 17 which evaluates the signals in a known fashion and furnishes, by way of the outputs A, braking pressure control signals to operate the electrically operable inlet and outlet valves 3 to 6; 7 to 10 and the separating valve 15, and to activate and deactive the pump drive motor 11.

The circuitry according to the present invention is part of the controller 17. This is represented by the part of the controller 17 which is denoted by reference numeral 18 and shown in broken lines.

Figure 2:
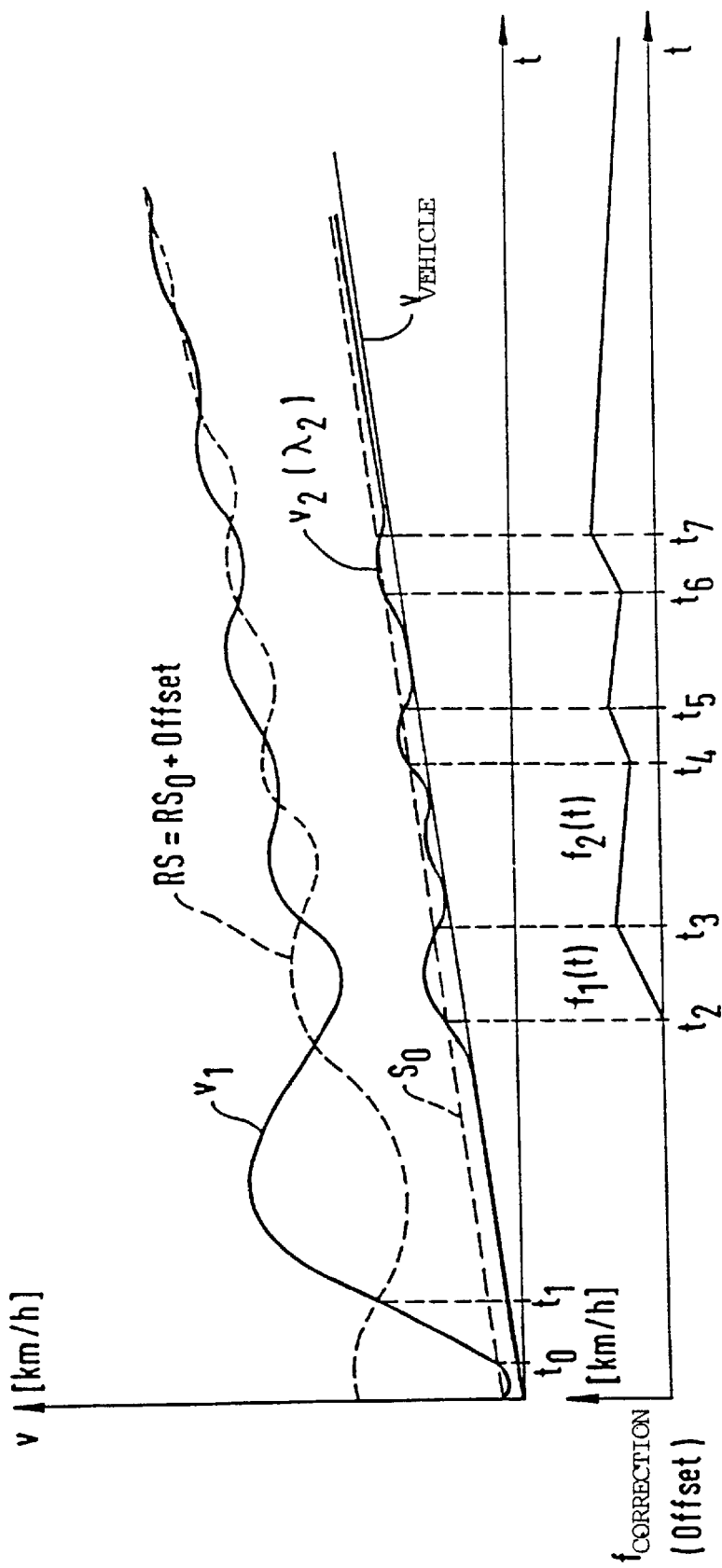
FIG. 2 shows the variation of the vehicle speed, the velocities of both driven wheels and the correction factor during a starting operation according to the present invention.

FIG. 2 shows the operation of the circuitry according to the present invention. FIG. 2 shows, as a function of time t, the speed $v_1$ of the drive wheel WHEEL 1 in FIG. 1 and the speed $v_2$ of the second wheel WHEEL 2 of the front axle VA, which is the driven axle in the present case. In addition, FIG. 2 shows in broken lines the control threshold RS, supplemented by an "offset" and its variation during the starting operation at issue, which is also shown. This offset or the correction factor $F_{CORRECTION}$ is made up of the two components $f_1(t)$ and $f_2(t)$.

During the starting operation to which FIG. 2 relates, WHEEL 1 whose wheel speed is referred to as $v_1$ exceeds the control threshold RS at time $t_1$. The traction slip of WHEEL 1 is limited in a known fashion by activation of the hydraulic pump 12, change-over of the separating valve 15, change-over of the inlet valve 4 leading to the stable WHEEL 2, and by the introduction of pressure into the wheel brake of the driven wheel WHEEL 1 by way of the inlet valve 3. Because WHEEL 1 will be the first wheel to undergo traction slip control in this situation, it may be assumed that the coefficient of friction on the side of this wheel is "low" compared to the coefficient of friction on the other vehicle side, i.e. on the side of the WHEEL 2. The control threshold RS remains unaffected by the circuitry of the present invention until the time $t_2$.

The slip on the second wheel WHEEL 2 of the driven axle, which is on the vehicle side with the high coefficient of friction in the moment considered (or at least behaves this way), is also monitored by way of the circuitry of the present invention. As soon as the slip on the wheel WHEEL 2 exceeds a predetermined, relatively low slip threshold $S_0$ of, for example, 2 km/h, a correction factor $f_{CORRECTION}$ is determined according to the relation $k_1 t$ and a corresponding "offset" is produced which corrects the control threshold RS. The addition of the correction factor $k_1 t$ to the control threshold $RS_0$ is continued until the speed of the second wheel WHEEL 2 drops below the slip threshold $S_0$ again at time $t_3$. The control threshold RS for the wheel on the side with the low coefficient of friction is made up of the control threshold $RS_0$ and the "offset".

The rise of the control threshold RS according to the function $k_1 t$ ends at time $t_3$ when the speed $v_2$ or the slip $M_2$ of the wheel on the side with the high coefficient of friction falls short of the slip threshold $S_0$ again. The reduction of the offset according to the function $k_2 t$ commences. The control threshold RS is now corrected according to this decreasing time function $k_2 t$ until the complete reduction of the offset or a new exceeding of the slip threshold $S_0$. The constant $k_1$ is greater than $k_2$. Therefore, the gradient of the correction factor $k_2 t$ is flatter than the gradient of the initial correction factor $k_1 t$. Thus, the control threshold RS of the controlled wheel (WHEEL 1) is decreased at a speed which is lower than the speed of the increase of the control threshold RS. The result is that the control frequency is reduced compared to a system where the rise and the reduction of the correction factors $k_1 t$ and $k_2 t$ would occur with the same inclination. The rise and the subsequent lowering of the control threshold RS is repeated after a new increase of the slip in excess of the threshold $S_0$ at time $t_4$, followed by a decline below the threshold at time $t_5$, and corresponding to the times $t_6$, $t_7$.

The result of the described rise of the control threshold RS commencing at time $t_2$ initated by the correction factor $k_1 t$ is a decrease of the braking pressure in the wheel brake of the controlled wheel. Thus, the excessive engine torque is conducted to the wheel (WHEEL 1) with the low coefficient of friction to a higher degree compared to conventional traction slip control systems with brake management. This occurs until the traction slip of the second, non-controlled drive wheel (WHEEL 2) has decreased to the threshold value $S_0$ again. The subsequent lowering of the control threshold RS with the gradient $k_2 t$ leads to a re-increase of the braking pressure level in the wheel brake of the controlled wheel. In turn, this causes an increase of the portion of the engine torque which is transmitted to the high friction wheel. In a way, a learning process is effected or, in other words, an adaption of the control threshold to the coefficient of friction which prevails on the vehicle side with the better road contact. The admissible slip is in each case reduced on the low friction side by lowering the control threshold RS, thereby causing an increase in the wheel braking pressure.

Figure 3:
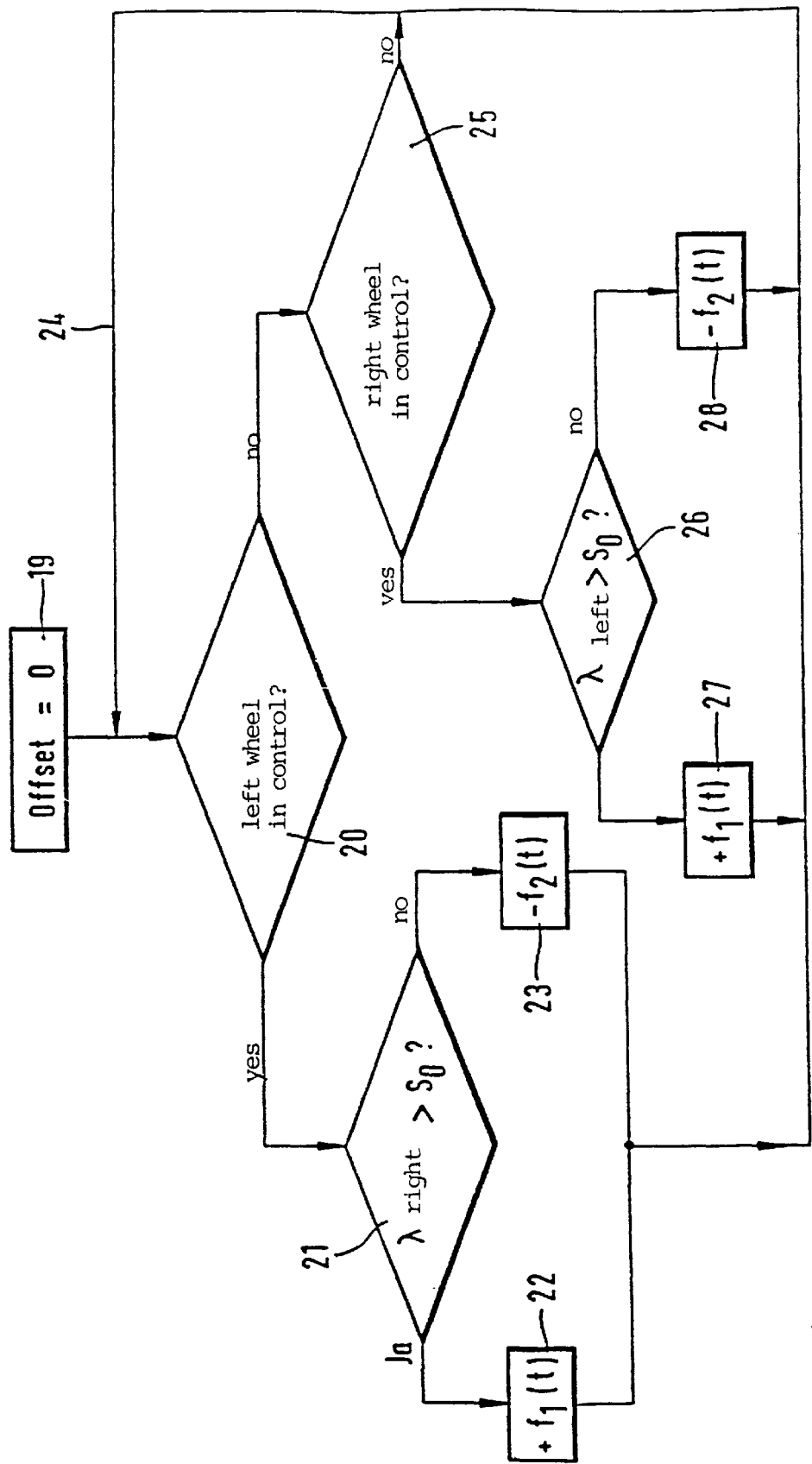
FIG. 3 is a flow chart showing the operation of the circuitry of the present invention.

The flow chart of FIG. 3 shows a part of the program of traction slip control with brake management which is performed by the circuitry of the present invention. The illustrated subroutine starts in step 19 with the condition that the correction factor or the offset is zero at this point of the program run of traction slip control with brake management. In step 20 it is determined which drive wheel is instantaneously controlled. When the left wheel is controlled, the further program run in branch 21 depends on whether the traction slip $M_2$ of the non-controlled (right-hand) drive wheel has exceeded the predetermined slip threshold $S_0$. When the traction slip of the non-controlled wheel is in excess of $S_0$, the control threshold is corrected by the correction factor $f_1(t)$ in step 22. When the traction slip of the non-controlled wheel drops below the slip threshold $S_0$, the offset is reduced by way of the correction factor $f_2(t)$, which is represented in step 23. This cycle is constantly repeated, as shown in return line 24.

When the control commences on the right wheel, or when a change in the coefficient of friction occurs, the decision process is effected in a similar manner by way of the branch lines and program steps 25, 26 or 28.

Only one wheel in each case may undergo traction slip control with brake management, as shown in FIG. 3. The control operation for this wheel is terminated as soon as the wheel runs stably again and the correction factor (offset) becomes zero.

With a change in the coefficient of friction, the drive wheel of the other vehicle side, which is now the side with the low coefficient of friction, will undergo control. The braking pressure becomes zero in the wheel brake of the wheel which is no longer controlled. The control threshold on the side with the low coefficient of friction is again adapted to the higher coefficient of friction of the vehicle side which has the better road contact. The allocation "high coefficient of friction side" and "low coefficient of friction side" can frequently change when the differences in the coefficient of friction on the right/left sides are insignificant.

Compared to known traction slip control systems with brake management, the present invention achieves a better utilization of slight differences in the coefficient of friction and, in total, a more comfortable control. In contrast to prior art systems which permit pressure increase up to the maximum system pressure in the wheel brakes of all controlled wheels, a larger portion of the excessive energy or the excessive engine torque is converted into kinetic energy of the low friction wheel according to the present invention. This reduces the portion of the excessive engine torque which is converted to heat energy in the wheel brake, thereby relieving the wheel brake. In addition, the availability of the control system is increased because it takes longer until the system must be disconnected due to heating up of the wheel brakes.

We claim:

1. Circuitry for a brake system with traction slip control by brake management, including wheel sensors to measure the wheel rotational behavior and electronic circuits to evaluate the sensor signals and to generate braking pressure control signals which are used to introduce braking pressure into the wheel brakes of the overspeeding wheel when a predetermined variable traction slip control threshold is exceeded, characterized in that circuits are provided which, after overspeeding of a wheel of a driven axle and commencement of traction slip control, determine the traction slip of the second, non-controlled wheel of this driven axle and evaluate this value to produce a correction factor which corrects the traction slip control threshold of the controlled wheel as a function of the instantaneous traction slip of the second, non-controlled wheel of the driven axle.

2. Circuitry as claimed in claim 1, characterized in that the traction slip control threshold of the controlled wheel is raised beyond a basic threshold by the correction factor as long as the traction slip of the second, non-controlled wheel of this axle is in excess of a predetermined traction slip threshold, and is reduced until the basic threshold is reached as long as the traction slip of the non-controlled wheel is below the predetermined traction slip threshold.

3. Circuitry as claimed in claim 2, characterized in that the correction factor is produced pursuant the relation $$f_{CORRECTION1} = f_1(t) - f_2(t),$$

and includes a first component $f_1(t)$ which, as long as the traction slip of the non-controlled wheel exceeds a predetermined traction slip threshold, raises the control threshold, and a second component $f_2(t)$ which, as long as the traction slip of the non-controlled wheel is below the predetermined traction slip threshold, lowers the control threshold until the basic threshold is reached.

4. Circuitry as claimed in claim 3, characterized in that the two components of the correction factor are functions which linearly rise or decrease, respectively, as a function of time.

5. Circuitry as claimed in claim 4, characterized in that the function which determines the rise of the traction slip control threshold of the controlled wheel has a steeper gradient than the function $(k_2 t)$ which determines the decrease of the traction slip control threshold.

6. Circuitry for a brake system with traction slip control by brake management comprising:
   a plurality of wheel sensors for measuring wheel rotational behavior and developing indications of wheel rotational behavior; and
   electronic circuitry for:
   (a) evaluating the indications of wheel rotational behavior, and
   (b) controlling braking pressure applied to a wheel brake associated with an overspeeding wheel when a predetermined variable traction slip control threshold is exceeded,
   said electronic circuitry including means for:
   (a) determining, after overspeeding of a first wheel of a driven axle and commencement of traction slip control of the first wheel, the traction slip of a second, non-controlled wheel of the driven axle,
   (b) evaluating the traction slip of the second wheel, and
   (c) producing a correction factor which adjusts the traction slip control threshold of the first wheel as a function of the instantaneous traction slip of the second wheel.

7. Circuitry according to claim 6 wherein the traction slip control threshold of the first wheel is:
   (a) raised by the correction factor beyond a basic threshold as long as the traction slip of the second wheel is in excess of a predetermined traction slip threshold, and
   (b) reduced by the correction factor until the basic threshold is reached as long as the traction slip of the second wheel is below the predetermine traction slip threshold.

8. Circuitry according to claim 7 wherein the correction factor is produced pursuant the relation $$f_{CORRECTION1} = f_1(t) - f_2(t),$$

and includes:
(a) a first $f_1(t)$ component which, as long as the traction slip of the second wheel exceeds a predetermined traction slip threshold, raises the control threshold, and
(b) a second $f_2(t)$ component which, as long as the traction slip of the second wheel is below the predetermined traction slip threshold, lowers the control threshold until the basic threshold is reached.

9. Circuitry according to claim 8 wherein the first $f_1(t)$ component and the second $f_2(t)$ component of the correction factor linearly rise or decrease as a function of time.

10. Circuitry according to claim 9 wherein the function which determines the rise of the traction slip control threshold of the controlled wheel has a steeper gradient than the function which determines the decrease of the traction slip control threshold.

* * * * *